US012728511B2

(12) United States Patent
Mayfield et al.

(10) Patent No.: US 12,728,511 B2
(45) Date of Patent: Sep. 8, 2026

(54) GROMMET INSTALLATION TOOL

(71) Applicant: The Boeing Company, Arlington, VA (US)

(72) Inventors: Brian Burton Mayfield, Maryland Heights, MO (US); Travis Arthur Roth, Florissant, MO (US)

(73) Assignee: The Boeing Company, Arlington, VA (US)

( * ) Notice: Subject to any disclaimer, the term of this patent is extended or adjusted under 35 U.S.C. 154(b) by 446 days.

(21) Appl. No.: 18/493,865

(22) Filed: Oct. 25, 2023

(65) Prior Publication Data

US 2025/0135618 A1 May 1, 2025

(51) Int. Cl.
*B25D 9/00* (2006.01)

(52) U.S. Cl.
CPC .................................... *B25D 9/00* (2013.01)

(58) Field of Classification Search
CPC ...... B25D 9/00; B25D 2250/171; B25D 9/12; B21D 39/06; B21D 41/02; B23P 19/04
USPC ..... 173/1-2, 13, 18-20, 184, 25-31, 38-39, 173/45-53
See application file for complete search history.

(56) References Cited

U.S. PATENT DOCUMENTS 1,356,401 A * 10/1920 Peirce .................. F16B 13/066 411/24
2,722,335 A * 11/1955 Somes, Jr. ............ B25B 27/026 100/230
2,997,715 A * 8/1961 Chapman ............. A41H 37/005 227/140
3,996,784 A * 12/1976 Champoux ............ B21J 15/022 29/520
4,644,656 A * 2/1987 Chouinard ............... B25D 9/00 30/362
4,724,608 A * 2/1988 Parrott .................. B25B 27/023 29/259
4,904,133 A * 2/1990 Wright ................ F16B 19/1054 29/512
5,425,164 A * 6/1995 El Dessouky ......... B21J 15/205 29/243.524
5,934,139 A * 8/1999 Tucker ...................... B25B 5/08 173/90
5,937,683 A * 8/1999 Chartier ................... B21D 1/12 72/21.5
7,059,565 B2 * 6/2006 Scown .................... B64C 1/066 244/119

(Continued)

FOREIGN PATENT DOCUMENTS

CN 110270823 A * 9/2019 .............. F16B 19/05
EP 0892183 A1 * 1/1999 ............ F16B 41/002

*Primary Examiner* — Robert F Long
(74) *Attorney, Agent, or Firm* — Yee & Associates, P.C.

(57) ABSTRACT

A grommet installation tool and methods using the installation tool for installing grommets. The grommet installation tool includes a hydraulic puller. An anvil is removably coupled to the hydraulic puller, the anvil including a proximal anvil end, a distal anvil end, and an anvil conduit that extends from the proximal anvil end to the distal anvil end, wherein the proximal anvil end is removably connected to the hydraulic puller. A mandrel is removably coupled to the anvil and the hydraulic puller, wherein the mandrel comprises a proximal mandrel end, and a threaded distal mandrel end. The mandrel passes through the anvil conduit and is removably connected to the hydraulic puller.

20 Claims, 11 Drawing Sheets

(56) References Cited

U.S. PATENT DOCUMENTS

| | | | | |
|---|---|---|---|---|
| 7,159,290 | B1 * | 1/2007 | Liu | B21J 15/205<br>72/453.17 |
| 7,437,904 | B2 * | 10/2008 | Katzenberger | B23P 9/025<br>29/523 |
| 7,765,703 | B2 * | 8/2010 | Buckus | B64F 5/10<br>33/645 |
| 8,813,537 | B1 * | 8/2014 | Diego | B21D 1/06<br>173/205 |
| 9,061,379 | B1 | 6/2015 | Mead et al. | |
| 11,129,430 | B2 * | 9/2021 | Luciani | B27F 7/19 |
| 2004/0164475 | A1 * | 8/2004 | Anderson | B64F 5/10<br>269/49 |
| 2008/0066796 | A1 * | 3/2008 | Mitchell | B64D 41/00<br>136/205 |
| 2008/0178711 | A1 * | 7/2008 | Heath | B25B 7/02<br>81/415 |
| 2010/0193210 | A1 * | 8/2010 | Krauter | B25F 5/006<br>173/171 |
| 2010/0295696 | A1 * | 11/2010 | Chu | B21J 15/326<br>340/665 |
| 2011/0083870 | A1 * | 4/2011 | McCarty, II | B25D 17/24<br>173/162.1 |
| 2015/0117050 | A1 * | 4/2015 | Burton | B60Q 1/2638<br>29/525.01 |
| 2015/0260217 | A1 * | 9/2015 | Woods | F16B 19/008<br>29/505 |
| 2016/0158819 | A1 * | 6/2016 | Johnson | B25D 9/16<br>173/128 |
| 2016/0271644 | A1 * | 9/2016 | Weinmann | B05C 17/015 |
| 2017/0120481 | A1 * | 5/2017 | Ingram, Jr. | B29C 33/505 |
| 2018/0185970 | A1 * | 7/2018 | Simmons | B01D 46/0005 |
| 2019/0382135 | A1 * | 12/2019 | Gonzalez | G01B 21/047 |
| 2021/0252674 | A1 * | 8/2021 | Stuart | B25B 27/04 |
| 2024/0417097 | A1 * | 12/2024 | Grip | F17C 13/083 |

* cited by examiner

SECTION C-C

SECTION B-B

GROMMET INSTALLATION TOOL

STATEMENT OF GOVERNMENT INTEREST

This invention was made with Government support under N00019-18-C-1012 awarded by the Department of Defense. The government has certain rights in this invention.

BACKGROUND INFORMATION

Field

The present disclosure relates generally to grommet installation tools and grommet installation methods, and more specifically to grommet installation tools and methods for aircraft.

Background

Typical grommet installation tools have a monolithic forming surface with inherent drawbacks. Consequently, removal of the tool from the installed grommet is problematic. Another problem with previous installation tools is the grommet inner diameter is deformed after forming inhibiting removal of the installation tool.

One previous unsatisfactory approach to facilitating removal was to introduce a taper to the inner diameter of the installed grommets using a tapered tool. However, this creates a need for subsequent work operations. Other unresolved issues are lack of portability of the installation tool, inadequate manufacturability, a lack of durability of the tool, a need for skilled labor, significant production time, and high costs.

Therefore, it would be desirable to have a grommet installation tool, as well as methods of using that tool that take into account at least some of the issues discussed above, as well as other possible issues.

SUMMARY

An embodiment of the present disclosure provides a method of installing a grommet, comprising: providing a hydraulic puller; coupling the hydraulic puller to a hydraulic power unit set at a predetermined hydraulic pressure; providing an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller; providing a mandrel removably coupled to the anvil and the hydraulic puller, wherein the mandrel comprises a proximal mandrel end, and a threaded distal mandrel end, wherein the mandrel passes through the anvil conduit and is removably connected to the hydraulic puller; providing a grommet, wherein the grommet comprises a proximal grommet end, a distal grommet end, and a grommet conduit that extends from the proximal grommet end to the distal grommet end, wherein the proximal grommet end comprises a grommet flange head; inserting the distal mandrel end through the grommet conduit until the distal anvil end contacts the grommet flange head; inserting the distal grommet end of the grommet through a hole in a web; threading reversibly a punch onto the threaded distal mandrel end, wherein the punch comprises a proximal punch end, a distal punch end, and a punch conduit that extends from the proximal punch end to the distal punch end, wherein the punch conduit comprises a proximal punch conduit end, and a threaded distal punch conduit end, and wherein the proximal punch end comprises a flaring geometry; activating the hydraulic puller, wherein the mandrel and punch are drawn toward the hydraulic puller while the anvil and grommet remain stationary against the web; contacting the distal grommet end with the flaring geometry of the proximal punch end; and forming the grommet.

Another embodiment of the present disclosure provides a grommet installation tool comprising: a hydraulic puller; an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller; and a mandrel removably coupled to the anvil and the hydraulic puller, wherein the mandrel comprises a proximal mandrel end, and a threaded distal mandrel end, wherein the mandrel passes through the anvil conduit and is removably connected to the hydraulic puller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
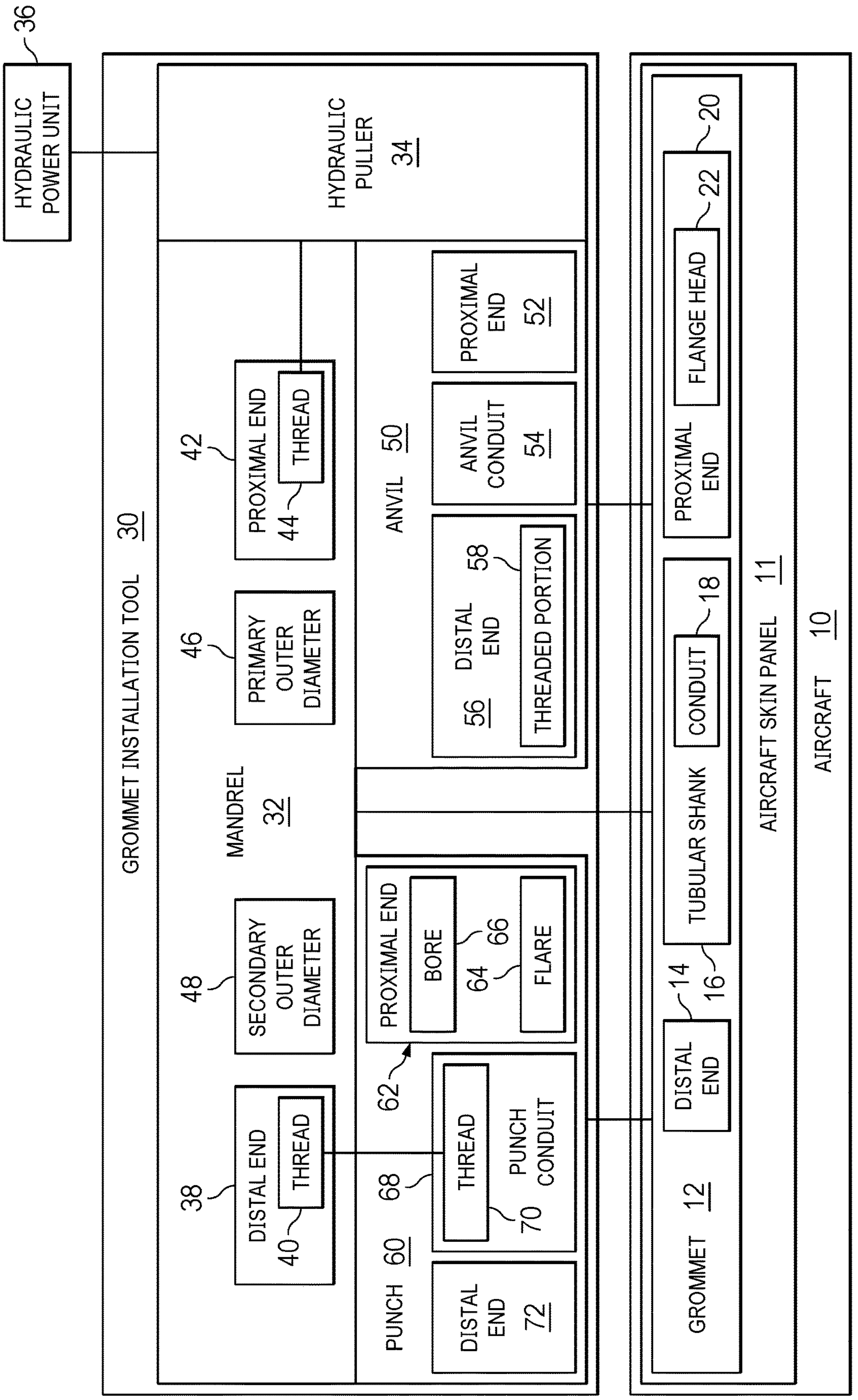
FIG. 1 is an illustration of a block diagram of an aircraft including a grommet and a grommet installation tool in accordance with an illustrative embodiment.

Turning now to FIG. 1, an illustration of a block diagram of an aircraft 10 with web 11 is depicted in accordance with an illustrative embodiment. A grommet 12 is coupled to the web 11.

Grommet 12 includes distal end 14. Grommet 12 includes tubular shank 16. Tubular shank 16 includes conduit 18. Grommet 12 includes proximal end 20. Proximal end 20 includes flange head 22.

Grommet tool 30 includes mandrel 32. Grommet installation tool 30 includes hydraulic puller 34. Mandrel 32 is mechanically coupled to hydraulic puller 34. Hydraulic puller 34 is coupled to hydraulic power unit 36.

Mandrel 32 includes distal end 38. Distal end 38 includes a threaded portion 40. Mandrel 32 includes proximal end 42. Proximal end 42 includes threaded portion 44. Mandrel 32 includes primary out diameter 46. Mandrel 32 includes secondary outer diameter 48.

Anvil 50 includes proximal end 52. Anvil 50 includes anvil conduit 54. Anvil 50 includes distal end 56. Anvil 56 includes threaded portion 58.

Punch 60 includes a proximal end 62. Proximal end 62 includes flare geometry 64. Proximal end 62 includes bore 66. Punch 60 includes punch conduit 68. Punch conduit 68 includes threaded portion 70. Punch 60 includes distal end 72.

An important and advantageous aspect of embodiments of this disclosure is that the punch 60 is unscrewed from the mandrel after forming the grommet 12. This allows the mandrel 32 to be removed (extracted) from the formed grommet quickly and easily by a reactivation of the hydraulic puller 34.

Reversibly threaded is intended to mean that mechanical coupling can be completed, then undone and optionally completed again and then undone again, potentially multiple times.

Figure 2A:
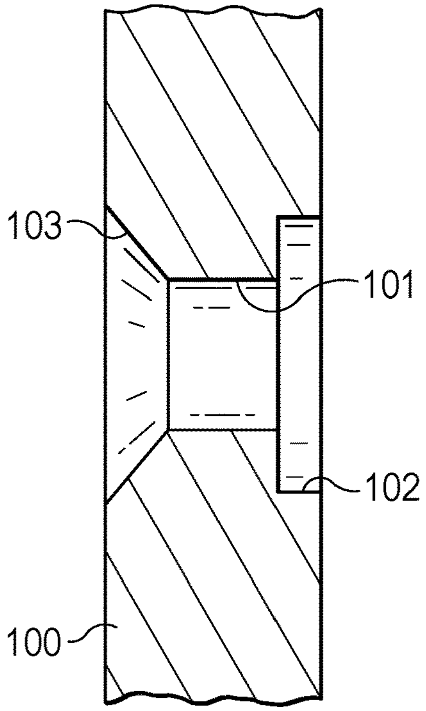
FIG. 2A is an illustration of an aircraft skin panel having a through hole in accordance with an illustrative embodiment.
Figure 2B:
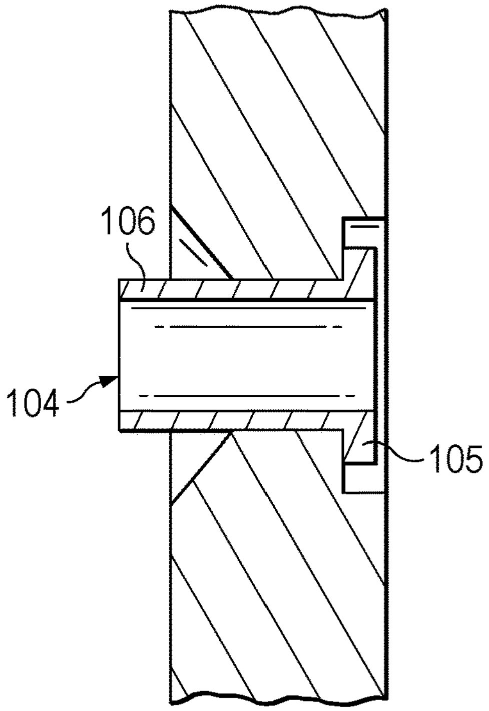
FIG. 2B is an illustration of a grommet located in the through hole in accordance with an illustrative embodiment.

Turning to FIGS. 2A-2B, in the illustrated embodiment of this disclosure an aircraft skin panel 100 (web) is prepared with a through hole 101. One end of the hole is counterbored 102. The opposite end of the hole is countersunk 103. A stainless-steel grommet 104 includes a flange head 105 and tubular shank 106 is inserted into the hole and seated in the counterbore.

Figure 3:
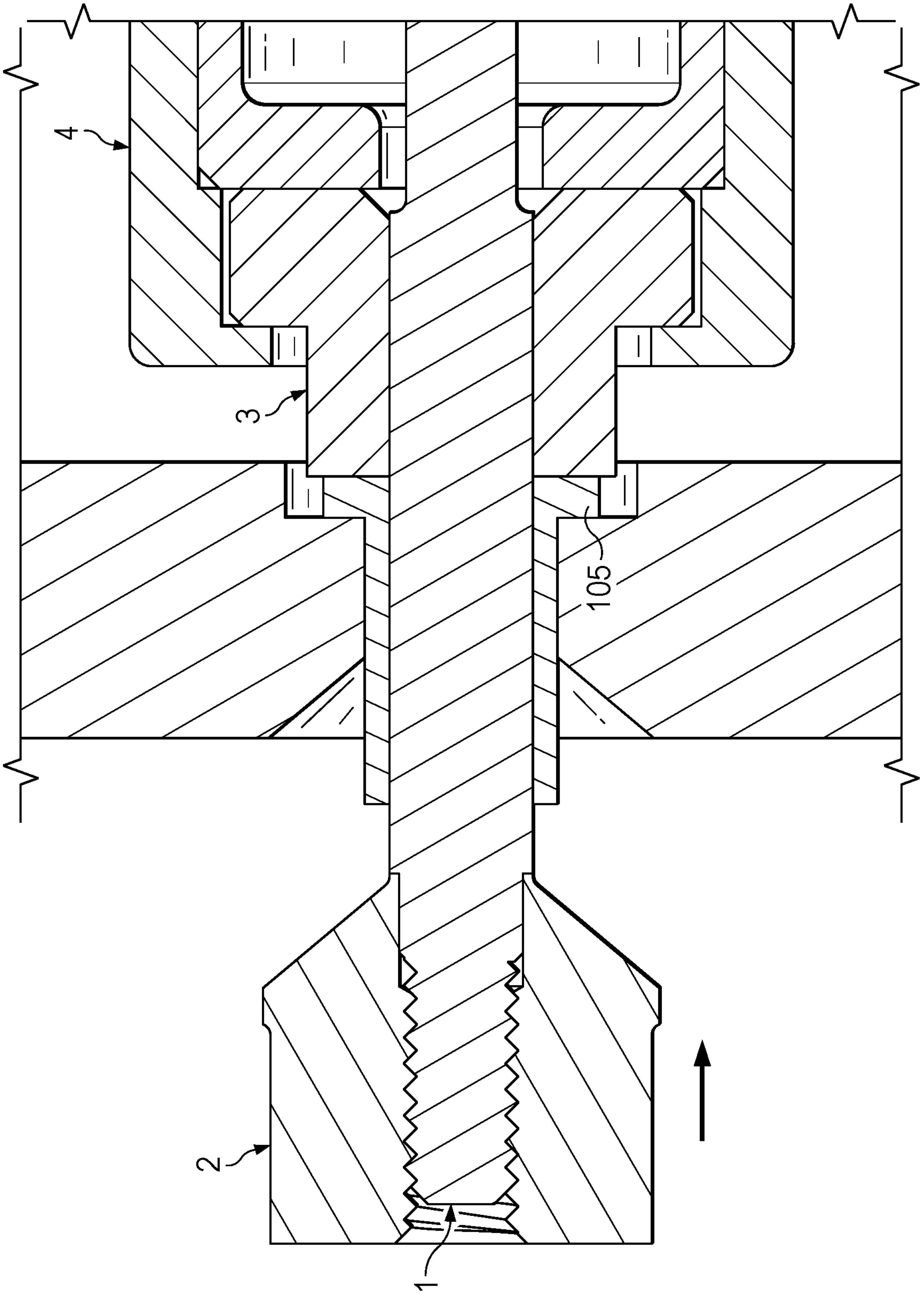
FIG. 3 is an illustration of a grommet installation tool connected to the grommet that is located in the through hole of the skin panel in accordance with an illustrative embodiment.

Turning to FIG. 3, in this embodiment the grommet install tool is prepared by affixing the anvil 3 and mandrel 1 to a hydraulic puller 4. The exposed end of the mandrel is inserted through the grommet flange head 105 and tubular shank 106 (defining a grommet conduit) until the anvil seats flush. The punch 2 is threaded onto the exposed end of the mandrel. The hydraulic puller is connected to a hydraulic power unit that is set at a predetermined hydraulic pressure. The hydraulic puller is activated, and the mandrel and punch are drawn towards the hydraulic puller while the anvil and grommet remain stationary against the aircraft skin panel (web). The flaring geometry of the punch contacts the tubular shank of the grommet and begins forming the grommet.

Figure 4:
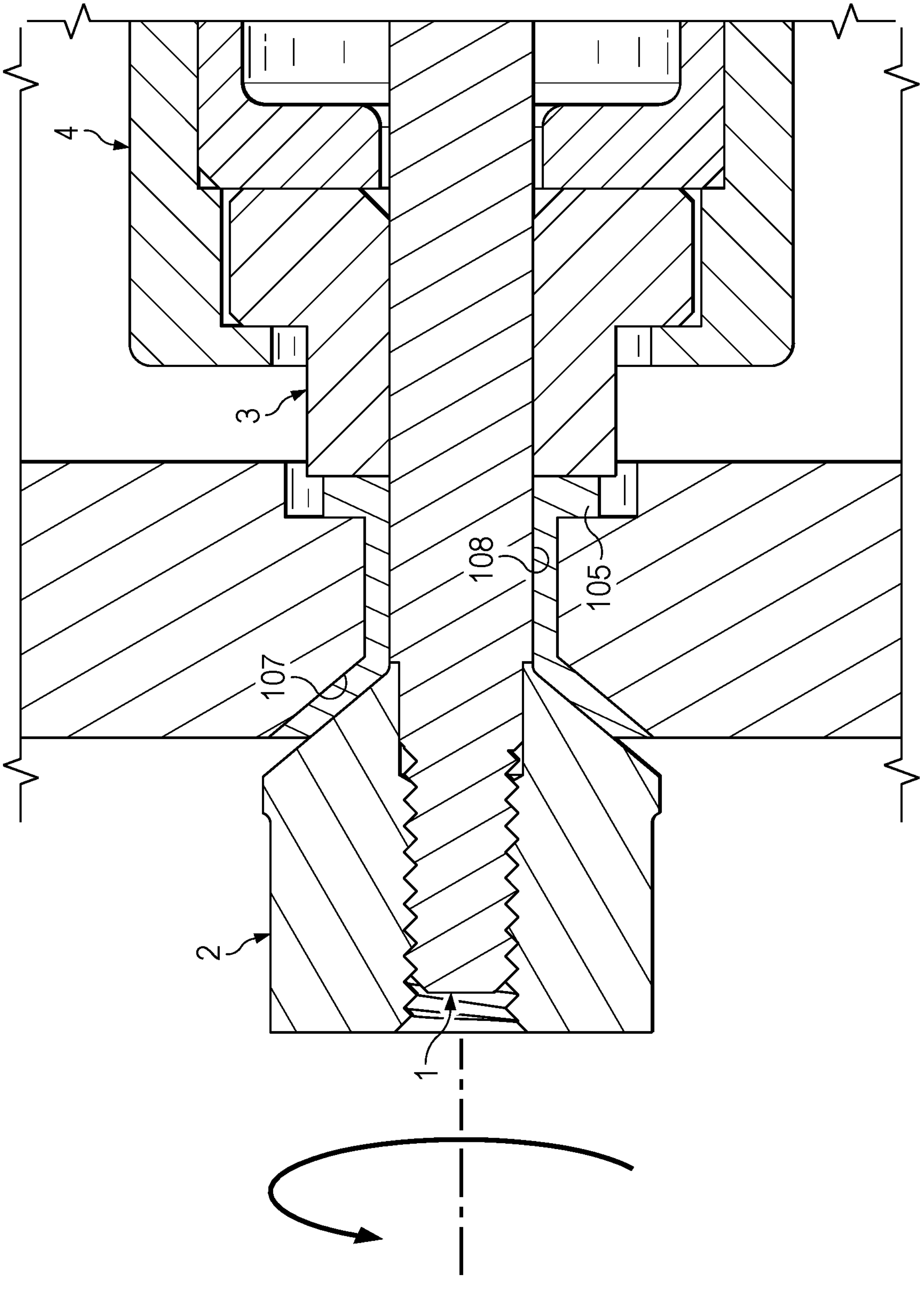
FIG. 4 is an illustration of the grommet installation tool compressing the grommet in accordance with an illustrative embodiment.

Turning to FIG. 4, in this embodiment the forming process continues until the hydraulic power unit reaches its set hydraulic pressure, at which point the tubular shank of the grommet deforms to completely fill the countersink 107. The remaining tubular shank of the grommet collapses inward 108, pressing against the outer diameter of the mandrel. The hydraulic puller is deactivated, and the punch is unthreaded (e.g., manually) from the mandrel. The mandrel remains in interference within the grommet.

Figure 5:
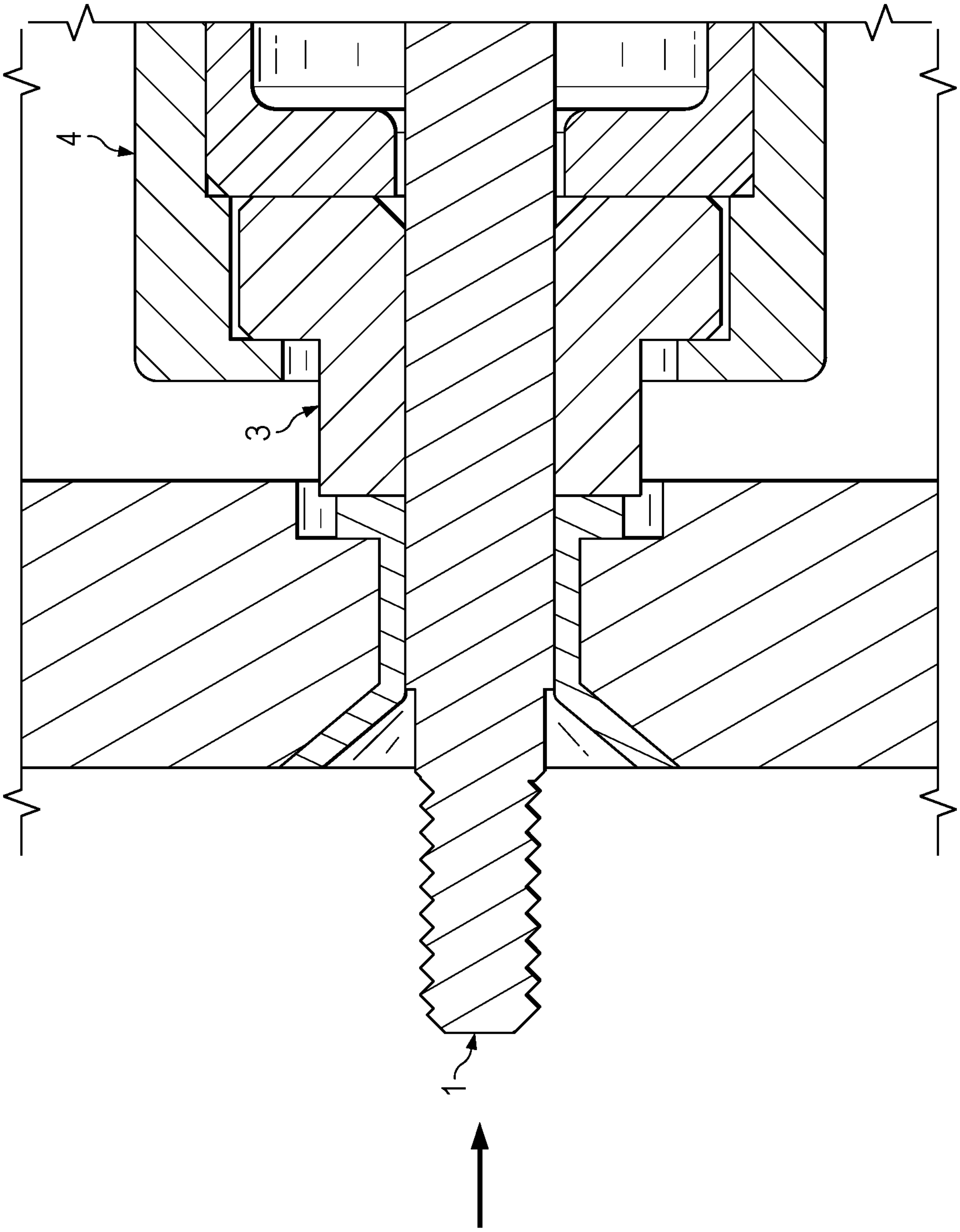
FIG. 5 is an illustration of the grommet installation tool with its punch removed in accordance with an illustrative embodiment.

Turning to FIG. 5, in this embodiment the hydraulic puller is activated a second time, drawing the mandrel completely through the grommet and removing the interference. The hydraulic puller automatically returns the mandrel to its original protruding position and the installation process may be repeated.

Figure 6:
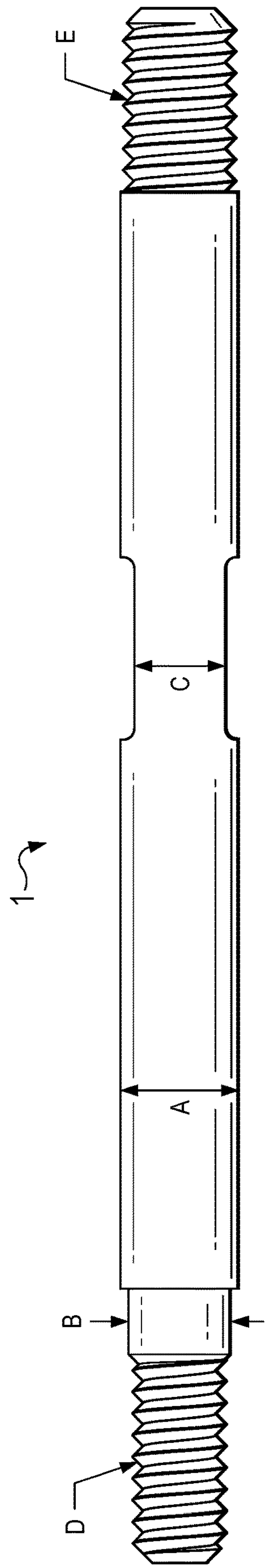
FIG. 6 is an illustration of the mandrel of the grommet installation tool in accordance with an illustrative embodiment.

Turning to FIG. 6, the mandrel 1 can include the following features. Embodiments can include an un-tapered primary outer diameter A providing means of supporting the grommet inner diameter from collapse during forming. Embodiments can include a secondary outer diameter B providing means of aligning the punch bore. Embodiments can include a threaded end D providing means of affixing the punch and of sufficient tensile area to complete installation without failure. Embodiments can include a threaded end E providing means of affixing the hydraulic puller. Embodiments of this disclosure can include one, some or all of the above features.

Figure 7A:
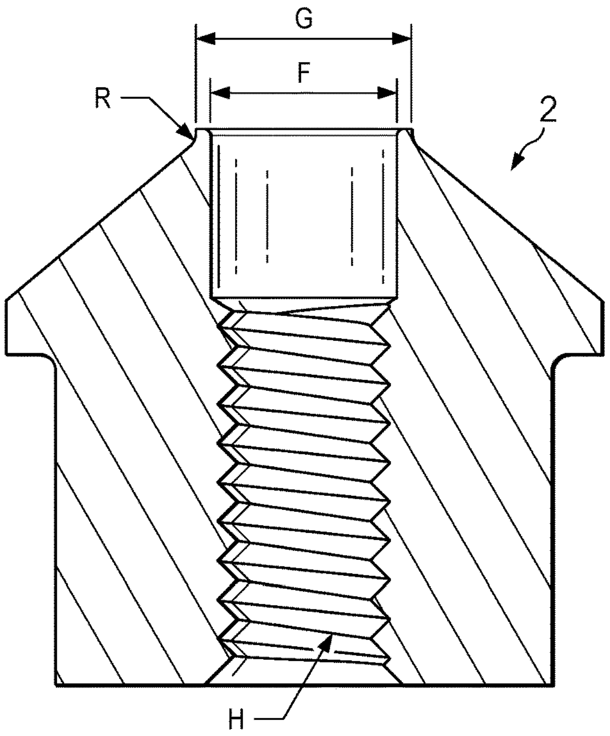
FIG. 7A is an illustration of a cross section (C-C) of the punch in accordance with an illustrative embodiment.
Figure 7B:
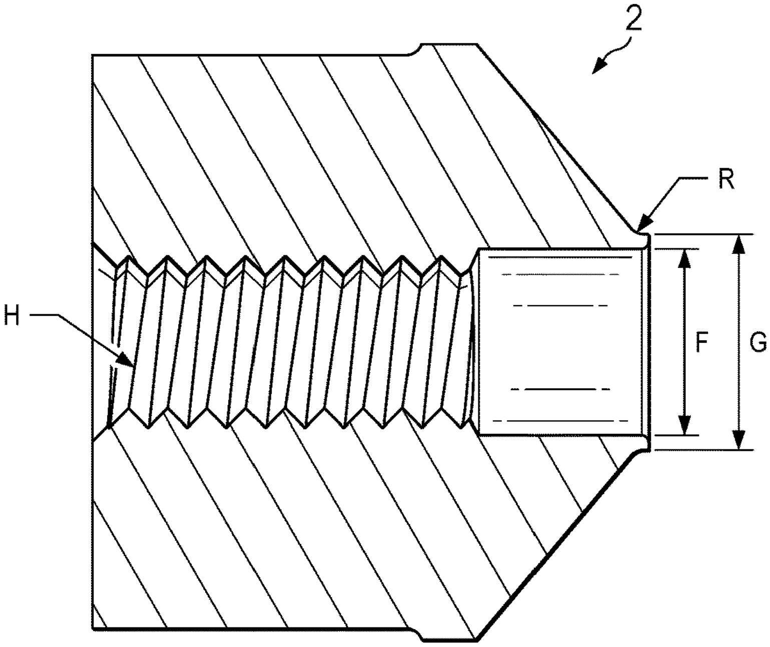
FIG. 7B is an illustration of a cross section (B-B) of the punch in accordance with an illustrative embodiment.
Figure 7C:
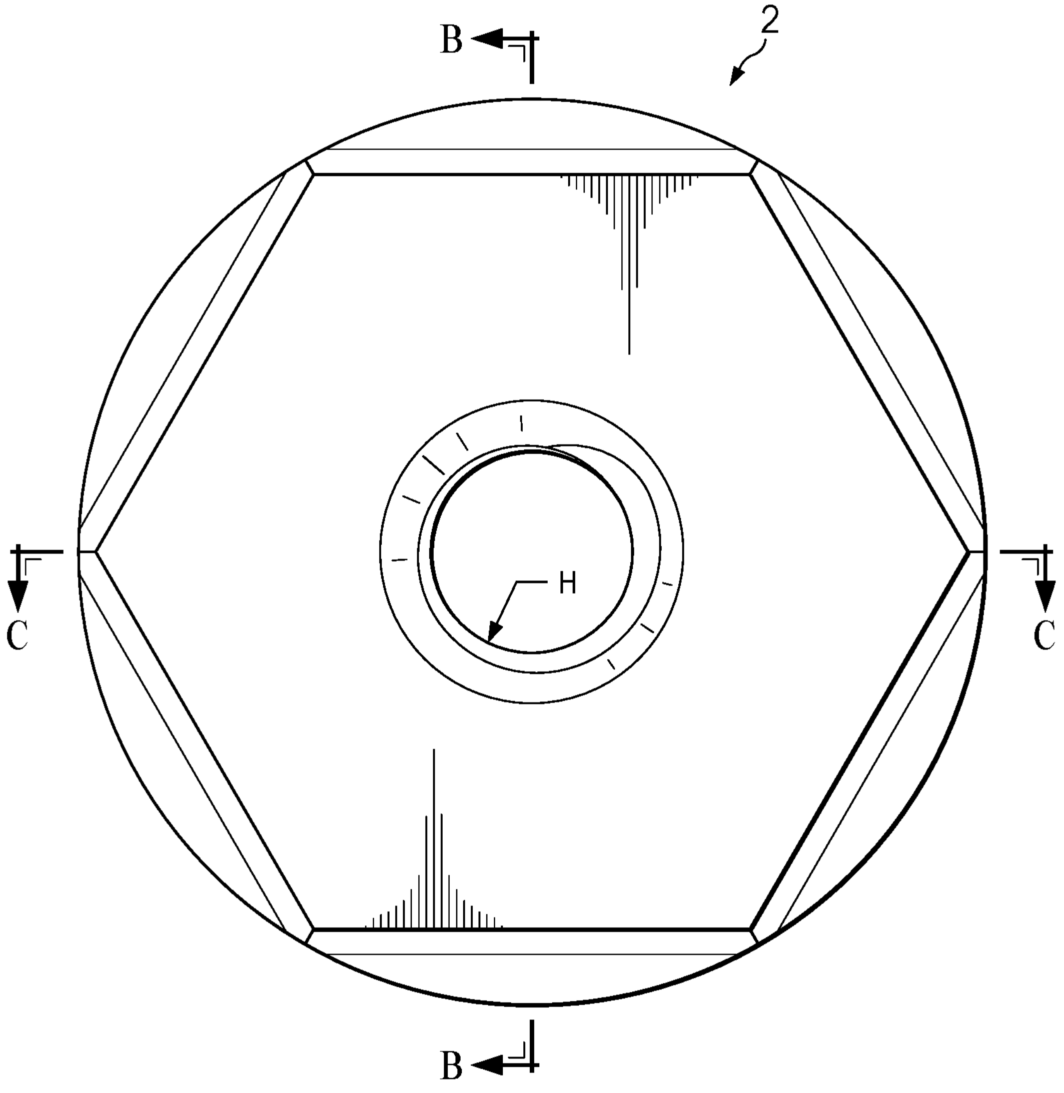
FIG. 7C is an illustration of a distal end of the punch in accordance with an illustrative embodiment.

Turning to FIGS. 7A-7C, the punch 2 can include the following features. Embodiments can include a bore F providing means of aligning to the mandrel secondary outer diameter. Embodiments can include an internally threaded hole H providing means of affixing to the mandrel. Embodiments can include wrenching flats providing gripping surface for hands or wrenches to assemble the punch and mandrel. Embodiments can include a conical flaring surface equivalent in angle to the angle of the hole countersink, providing means of forming the grommet to the countersink. Embodiments can include a fillet radius R joining the conical flaring surface and terminating at a diameter G equal to the mandrel primary outer diameter, providing a smooth transition surface for forming. Embodiments can include one, some or all of the above features.

The features described above can provide the following advantages and benefits. The punch 2 and mandrel 1 assemble to create a continuous, smooth surface for forming. Consequently, the maximum tensile stress area is increased permitting installation of larger, stronger grommets and formation into deeper countersinks. After forming, the punch is easily removed (e.g., by hand) and the mandrel is easily removed by a second activation of the hydraulic puller. The grommet inner diameter remains cylindrical after forming and removal of the installation tool. Embodiments of this disclosure are preferred, as they can eliminate subsequent work operations. The portability of the installation tool, manufacturability, and durability are all improved. Operation is simplified, reducing skill needed, production time, and costs.

As used herein, the phrase at least one of, when used with a list of items, means different combinations of one or more of the listed items may be used and only one of each item in the list may be needed. For example, at least one of item A, item B, or item C may include, without limitation, item A, item A and item B, or item B. This example also may include item A, item B, and item C or item B and item C. Of course, any combinations of these items may be present. In other examples, at least one of may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required. As used herein, a number of, when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional.

Figure 8A:
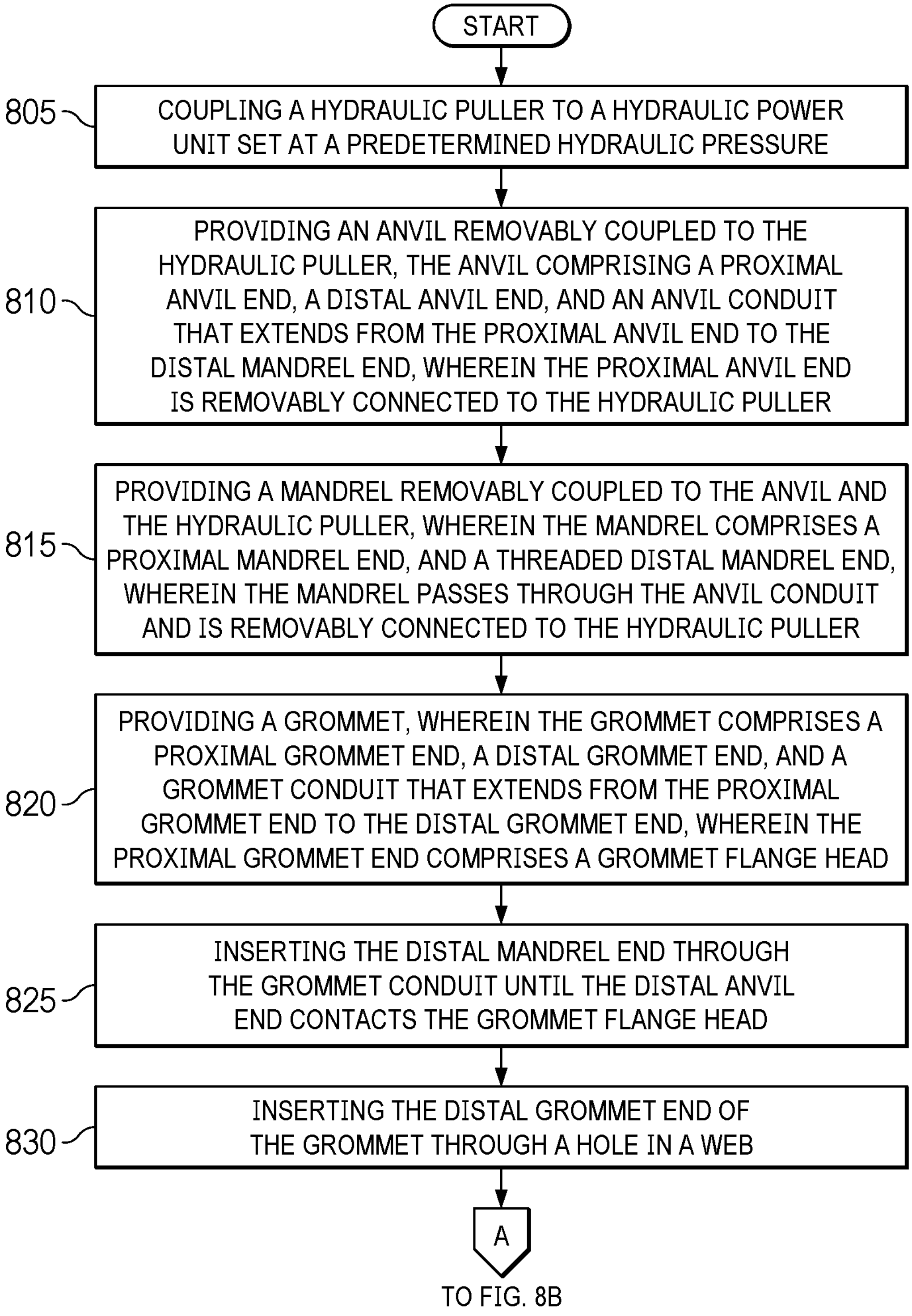
FIGS. 8A-8B are a flowchart of a method of installing a grommet in accordance with an illustrative embodiment.
Figure 8B:
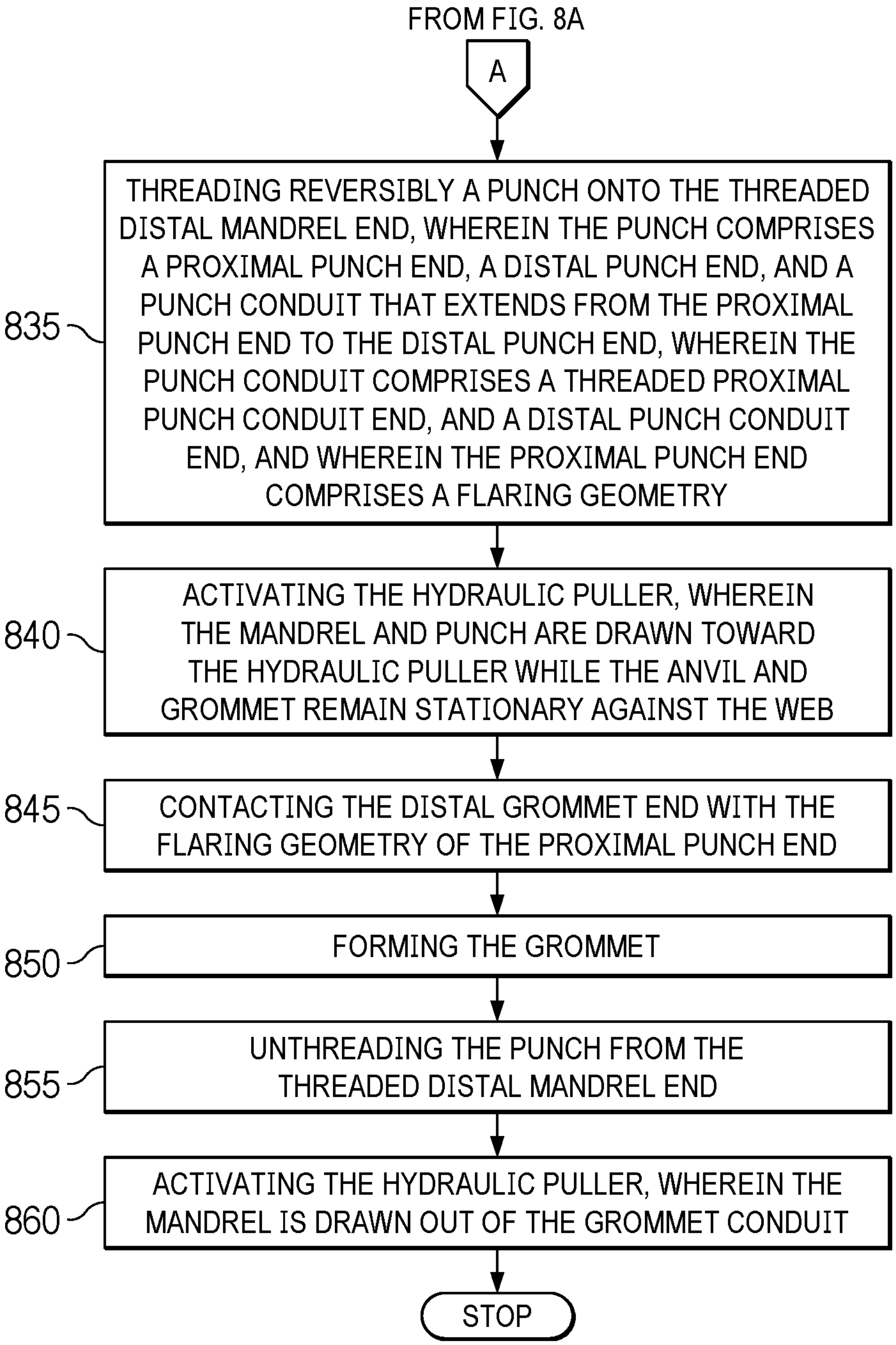

Turning to FIGS. 8A-8B, an embodiment of this specification can include a method of installing a grommet 800. Block 805 includes coupling a hydraulic puller to a hydraulic power unit set at a predetermined hydraulic pressure. Block 810 includes providing an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller. Block 815 includes providing a mandrel removably coupled to the anvil and the hydraulic puller, wherein the mandrel includes a proximal mandrel end, and a threaded distal mandrel end, wherein the mandrel passes through the anvil conduit and is removably connected to the hydraulic puller. Block 820 includes providing a grommet, wherein the grommet includes a proximal grommet end, a distal grommet end, and a grommet conduit that extends from the proximal grommet end to the distal grommet end, wherein the proximal grommet end includes a grommet flange head. Block 825 includes inserting the distal mandrel end through the grommet conduit until the distal anvil end contacts the grommet flange head. Block 830 includes inserting the distal grommet end of the grommet through a hole in a web. Block 835 includes threading reversibly a punch onto the threaded distal mandrel end, wherein the punch includes a proximal punch end, a distal punch end, and a punch conduit that extends from the proximal punch end to the distal punch end, wherein the punch conduit includes a proximal punch conduit end, and a threaded distal punch conduit end, and wherein the proximal punch end includes a flaring geometry. Block 840 includes activating the hydraulic puller, wherein the mandrel and punch are drawn toward the hydraulic puller while the anvil and grommet remain stationary against the web. Block 845 includes contacting the distal grommet end with the flaring geometry of the proximal punch end. Block 850 includes forming the grommet. In this embodiment, block 855 is optional and includes unthreading the punch from the threaded distal mandrel end. In this embodiment, block 860 is optional and includes reactivating the hydraulic puller, wherein the mandrel is drawn out of the grommet conduit.

Figure 9:
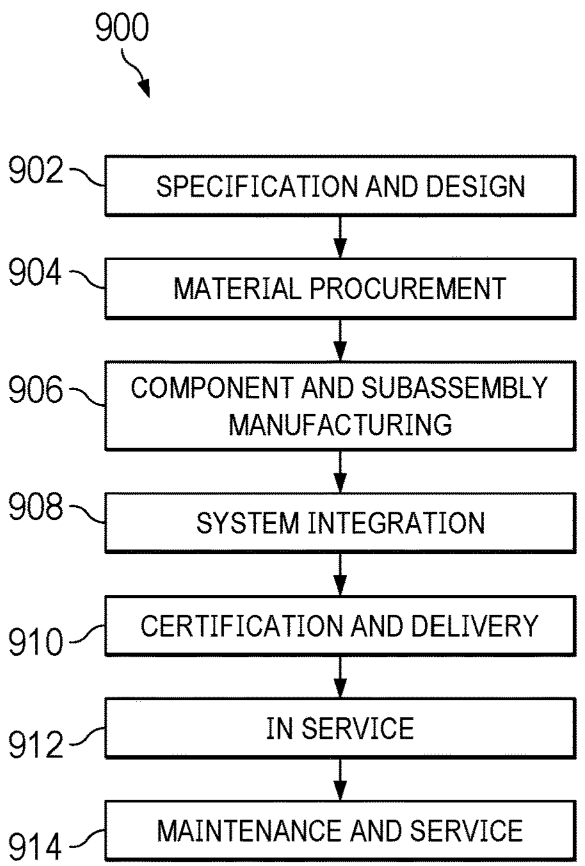
FIG. 9 is an illustration of an aircraft manufacturing and service method in a form of a block diagram in accordance with an illustrative embodiment.
Figure 10:
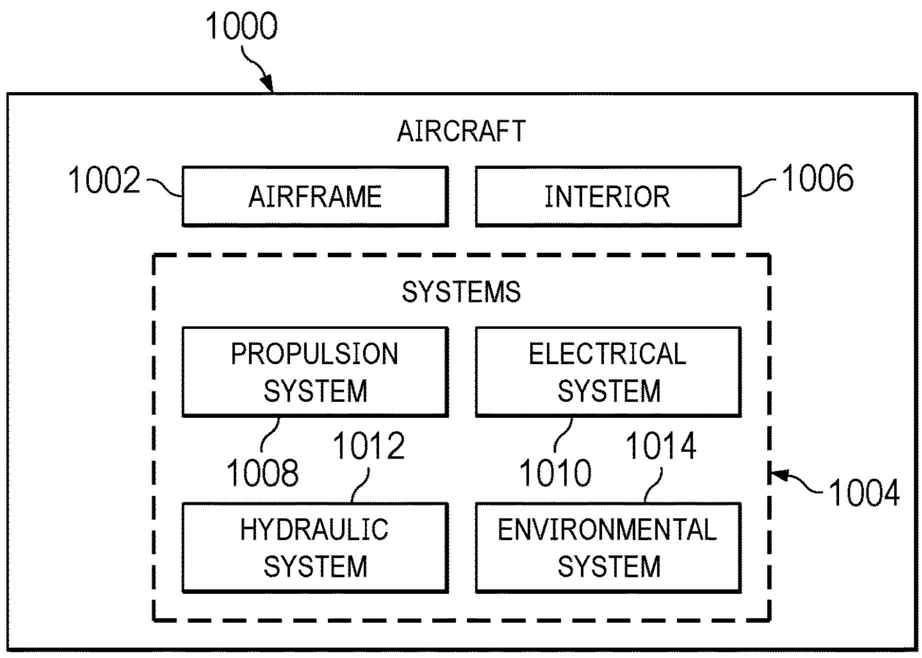
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in the form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of installing a grommet, comprising:

providing a hydraulic puller;

coupling the hydraulic puller to a hydraulic power unit set at a predetermined hydraulic pressure;

providing an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller;

providing a mandrel removably coupled to the anvil and the hydraulic puller, wherein the mandrel comprises a proximal mandrel end, and a threaded distal mandrel end, wherein the mandrel passes through the anvil conduit and is removably connected to the hydraulic puller;

providing a grommet, wherein the grommet comprises a proximal grommet end, a distal grommet end, and a tubular shank defining a grommet conduit that extends from the proximal grommet end to the distal grommet end, wherein the proximal grommet end comprises a grommet flange head;

inserting the distal mandrel end through the grommet conduit until the distal anvil end contacts the grommet flange head;

inserting the distal grommet end of the grommet through a hole in a web;

threading reversibly a punch onto the threaded distal mandrel end, wherein the punch comprises a proximal punch end, a distal punch end, and a punch conduit that extends from the proximal punch end to the distal punch end, wherein the punch conduit comprises a proximal punch conduit end, and a threaded distal punch conduit end, and wherein the proximal punch end comprises a flaring geometry;

activating the hydraulic puller, wherein the mandrel and punch are drawn toward the hydraulic puller while the anvil and grommet remain stationary against the web;

contacting the distal grommet end with the flaring geometry of the proximal punch end; and forming the grommet; and wherein the mandrel comprises an un-tapered primary outer diameter between the proximal mandrel end and the threaded distal mandrel end, the un-tapered primary outer diameter supports an inner diameter of a grommet from collapse during forming, and wherein the mandrel comprises a secondary outer diameter between the un-tapered primary outer diameter and the threaded distal mandrel end, the secondary outer diameter aligning a punch bore relative to the mandrel.

2. The method of installing a grommet of claim 1, further comprising unthreading the punch from the threaded distal mandrel end.

3. The method of installing a grommet of claim 2, further comprising reactivating the hydraulic puller, wherein the mandrel is drawn out of the grommet conduit.

4. The method of installing a grommet of claim 1, wherein forming the grommet comprises forming the distal grommet end.

5. The method of installing a grommet of claim 1, wherein inserting the distal grommet end of the grommet through a hole in the web comprises inserting the distal grommet end of the grommet through a hole in an aircraft skin panel.

6. A grommet installation tool, comprising:

a hydraulic puller;

an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller; and a mandrel removably coupled to the anvil and the hydraulic puller, wherein the mandrel comprises a proximal mandrel end, and a threaded distal mandrel end, wherein the mandrel passes through the anvil conduit and is removably connected to the hydraulic puller, wherein the mandrel comprises an un-tapered primary outer diameter between the proximal mandrel end and the threaded distal mandrel end, the un-tapered primary outer diameter supports an inner diameter of a grommet from collapse during forming, and wherein the mandrel comprises a secondary outer diameter between the un-tapered primary outer diameter and the threaded distal mandrel end, the secondary outer diameter aligning a punch bore relative to the mandrel.

7. The grommet installation tool of claim 6, further comprising:

a punch removably coupled to the mandrel, wherein the punch comprises a proximal punch end, a distal punch end, and a punch conduit that extends from the proximal punch end to the distal punch end, wherein the punch conduit comprises a proximal punch conduit end comprising the punch bore and a distal punch conduit end comprising a threaded portion, and wherein the proximal punch end comprises a flaring geometry adapted to form a grommet.

8. The grommet installation tool of claim 7, wherein the distal punch conduit end is reversibly threaded onto the threaded distal mandrel end of the mandrel.

9. The grommet installation tool of claim 6, wherein the proximal mandrel end comprises a threaded portion coupled to the hydraulic puller.

10. The grommet installation tool of claim 6, wherein the distal anvil end is adapted to form a grommet.

11. The grommet installation tool of claim 6, further comprising a grommet coupled to the mandrel, wherein the grommet comprises a tubular shank.

12. A grommet installation tool, comprising:

a hydraulic puller;

an anvil removably coupled to the hydraulic puller, the anvil comprising a proximal anvil end, a distal anvil end, and an anvil conduit that extends from the proximal anvil end to the distal anvil end, wherein the proximal anvil end is removably connected to the hydraulic puller;

a mandrel removably coupled to the anvil and the hydraulic puller, wherein the mandrel comprises a proximal mandrel end, and a threaded distal mandrel end, wherein the mandrel passes through the anvil conduit and is removably connected to the hydraulic puller, wherein the mandrel comprises an un-tapered primary outer diameter between the proximal mandrel end and the threaded distal mandrel end, the un-tapered primary outer diameter supports an inner diameter of a grommet, and wherein the mandrel comprises a secondary outer diameter between the un-tapered primary outer diameter and the threaded distal mandrel end, the secondary outer diameter aligning a punch bore relative to the mandrel; and a punch removably coupled to the mandrel, wherein the punch comprises a proximal punch end, a distal punch end, and a punch conduit that extends from the proximal punch end to the distal punch end, wherein the punch conduit comprises a proximal punch conduit end, and a threaded distal punch conduit end, and wherein the proximal punch end comprises a flaring geometry;

wherein the threaded distal punch conduit end is reversibly threaded onto the threaded distal mandrel end of the mandrel.

13. The grommet installation tool of claim 12, wherein the proximal mandrel end comprises a threaded portion coupled to the hydraulic puller.

14. The grommet installation tool of claim 12, wherein the distal anvil end is adapted to form a grommet.

15. The grommet installation tool of claim 12, further comprising a grommet coupled to the mandrel, wherein the grommet comprises a tubular shank.

16. The grommet installation tool of claim 12, further comprising a grommet coupled to the mandrel, wherein the grommet comprises a proximal grommet end, a distal grommet end, and a tubular shank.

17. The grommet installation tool of claim 16, wherein the tubular shank defines a grommet conduit that extends from the proximal grommet end to the distal grommet end.

18. The grommet installation tool of claim 17, wherein the proximal grommet end comprises a grommet flange head.

19. The grommet installation tool of claim 18, wherein the distal mandrel end extends through the grommet conduit and contacts the grommet flange head.

20. The grommet installation tool of claim 16, wherein the distal grommet end contacts the flaring geometry of the proximal punch end.

* * * * *